(12) United States Patent
Humlicek

(10) Patent No.: US 6,813,687 B1
(45) Date of Patent: Nov. 2, 2004

(54) RAID VOLUME FOR SEQUENTIAL USE THAT NEEDS NO REDUNDANCY PRE-INITIALIZATION

(75) Inventor: Donald R. Humlicek, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 730 days.

(21) Appl. No.: 09/645,949

(22) Filed: Aug. 25, 2000

(51) Int. Cl.$^7$ .............................................. G06F 12/02
(52) U.S. Cl. ................................ 711/114; 714/6; 713/1
(58) Field of Search ............................. 711/4, 111–112, 711/114, 166, 168, 170, 201; 713/1–2; 714/5–6, 11–13; 710/10

(56) References Cited

U.S. PATENT DOCUMENTS

| | | | | |
|---|---|---|---|---|
| 5,822,782 A | * | 10/1998 | Humlicek et al. | 711/170 |
| 6,098,119 A | * | 8/2000 | Surugucchi et al. | 710/10 |
| 6,334,195 B1 | * | 12/2001 | DeKoning et al. | 714/7 |
| 6,467,023 B1 | * | 10/2002 | DeKoning et al. | 711/114 |
| 6,510,491 B1 | * | 1/2003 | Franklin et al. | 711/114 |

* cited by examiner

Primary Examiner—Denise Tran
(74) Attorney, Agent, or Firm—Christopher P. Maiorana, P.C.

(57) ABSTRACT

A method for providing sequential initialization of redundancy data in a volume comprising the steps of: (A) defining a boundary; (B) determining a location of the data with respect to the boundary; and (C) initializing a redundancy location of the volume and writing the data and a redundancy of the data to the volume.

23 Claims, 2 Drawing Sheets

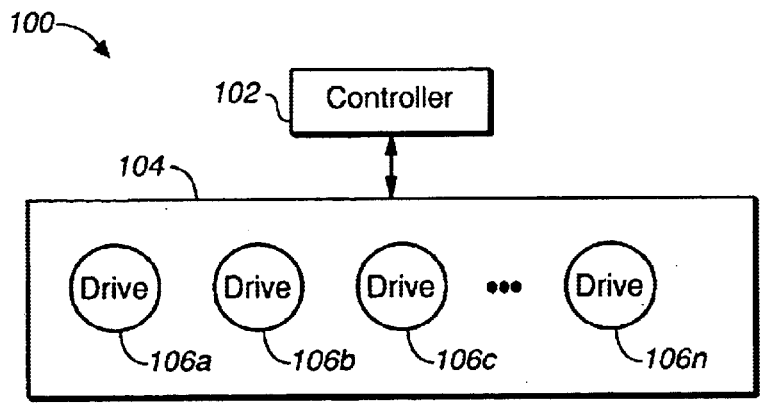
FIG._1
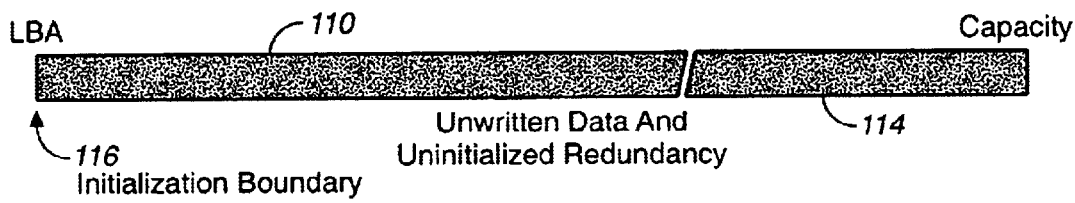
FIG._2a
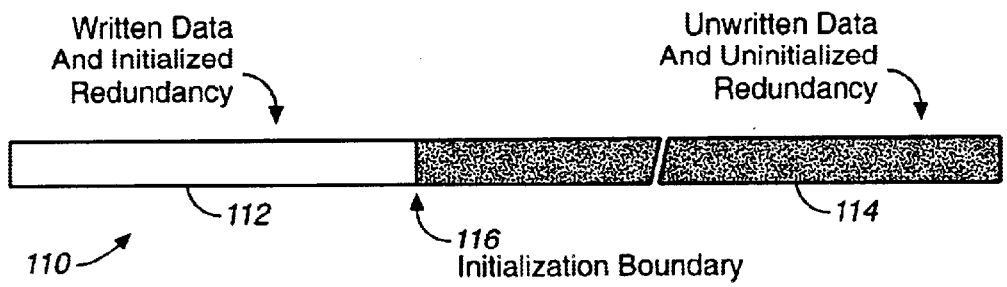
FIG._2b
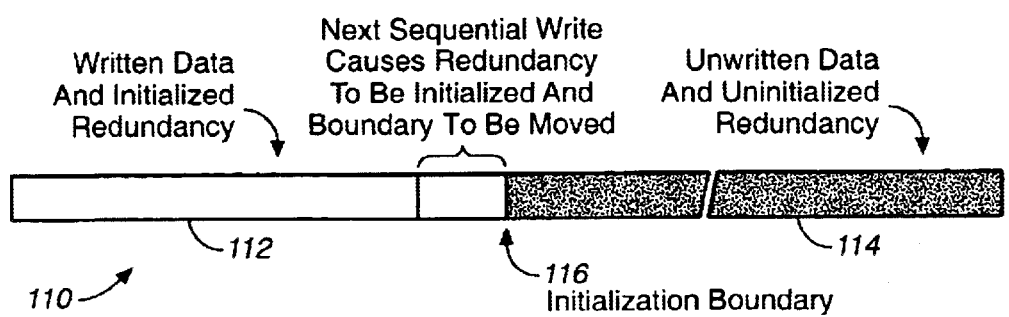
FIG._2c

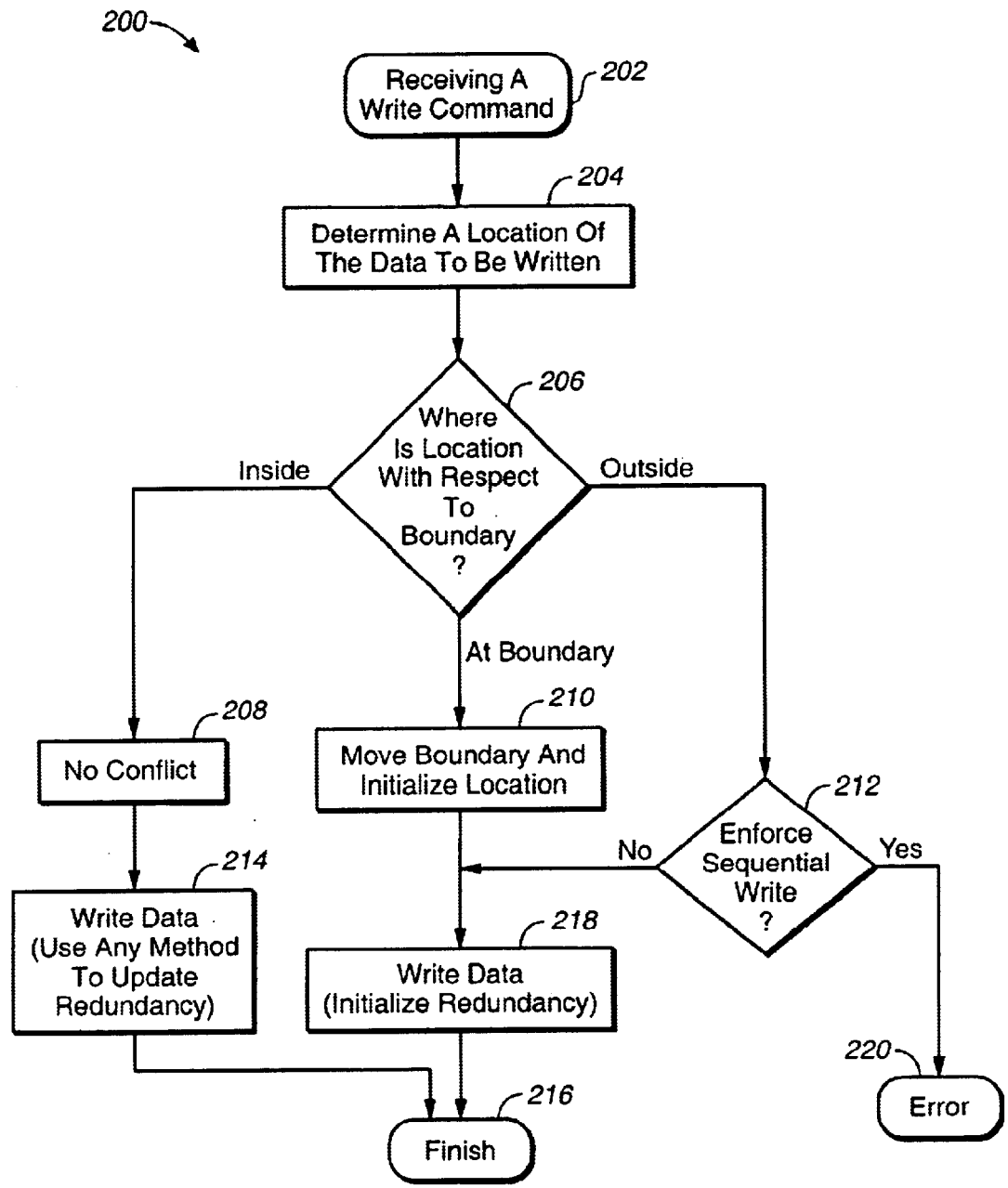
FIG._3

RAID VOLUME FOR SEQUENTIAL USE THAT NEEDS NO REDUNDANCY PRE-INITIALIZATION

FIELD OF THE INVENTION

The present invention relates to a method and/or architecture for configuring a redundant array of inexpensive disks (RAID) volume generally and, more particularly, to a RAID volume that does not require redundancy pre-initialization.

BACKGROUND OF THE INVENTION

When implementing volume redundancy, such as RAID 1 or RAID 5, the volume redundancy must be initialized. Two conventional approaches are used for initializing volume redundancy. However, both the conventional approaches (i) are performed when a volume is created and (ii) reduce host or array controller bandwidth during the initialization process. A first conventional approach writes blocks of zeros to both a primary data block and a redundancy data block. The blocks of zeros are written to every sector in a volume for both the primary data block and the redundancy data block (i.e., the parity partition or the mirror partition, depending on the redundancy level). The entire volume is unavailable for use until the initialization is complete.

A second conventional approach is dependent on a particular RAID level. The second conventional approach requires existing blocks of data to be read from drives and new redundancy information to be created and written back to the drives. Such an approach allows the existing data volume to be used during initialization, with special handling for write operations to the area of the volume that has not yet been initialized. However, performance is compromised while the initialization runs in the background.

The second conventional method allows a host to perform read and write operations on the existing data volume. However, an array controller of the host is required to know what area of the volume has been initialized and what area of the volume has not been initialized. The array controller is required to perform a specialized read and/or write that can require additional complex logic.

When implementing the RAID 5 redundancy method, blocks of data are read across the same block on each of the drives involved in the volume to compute parity (i.e., an XOR operation). The RAID 5 method is then required to write parity to the redundancy data block location.

It is therefore desirable to provide a system that will initialize a redundant volume without a preinitialization routine and without adversely affecting performance.

SUMMARY OF THE INVENTION

The present invention concerns a method for providing sequential initialization of redundancy data in a volume comprising the steps of: (A) defining a boundary; (B) determining a location of the data with respect to the boundary; and (C) initializing a redundancy location of the volume and writing the data and a redundancy of the data to the volume.

The objects, features and advantages of the present invention include providing a method and/or architecture for implementing a redundant array of inexpensive disks (RAID) volume that may (i) allow for sequential operation, (ii) operate without redundancy pre-initialization and/or (iii) eliminate an initializing volume redundancy process by implementing volume that is written sequentially.

BRIEF DESCRIPTION OF THE DRAWINGS

These and other objects, features and advantages of the present invention will be apparent from the following detailed description and the appended claims and drawings in which:

FIG. 1 is a block diagram of a preferred embodiment of the present invention;

FIGS. 2(a–c) are block diagrams of an operation of the present invention; and

FIG. 3 is a flow diagram illustrating an operation of the present invention.

DETAILED DESCRIPTION OF THE PREFERRED EMBODIMENTS

Referring to FIG. 1, a block diagram of a circuit (or system) 100 is shown in accordance with a preferred embodiment of the present invention. The circuit 100 may implement a sequential redundancy initialization process. The circuit 100 generally comprises a controller 102 and an array 104. The controller 102 generally controls the level of redundancy of the array 104. The array 104 generally comprises a number of drives 106a–106n. The array 104 and the drives 106a–106n may implement one or more volumes. One volume may be used to store data and one volume may be used to store redundant data. Additionally, a volume may be divided into a number of portions configured to read and write data. However, the particular format of the volumes may vary according to the particular redundancy protocol (e.g., RAID 1, RAID 5, etc.).

The system 100 may initially write to a volume sequentially (e.g., starting at logical block address (LBA) zero and ascend to a highest LBA), so that redundancy information may be initialized as data is written (to be discussed further in connection with FIGS. 2 and 3). By implementing sequential redundancy initialization of a volume as data is written, a full initialization of the redundancy volume may be avoided. Since a full initialization is time consuming and/or performance degrading, the circuit 100 may provide an overall improved performance.

In order to avoid a full background initialization of a redundant volume, a predetermined attribute (e.g., host sequential use initialization) may be implemented when a primary data volume is initially created in a redundant environment. In one example, the predetermined attribute may be a user selectable attribute. However, other appropriate predetermined attributes and/or configurations of the predetermined attribute(s) may be implemented in order to meet the criteria of a particular implementation.

Referring to FIGS. 2(a–c), a detailed diagram of the operation of the present invention is shown. A volume 110 in various stages of initialization is shown. The volume 110 may be implemented as a redundant volume in a redundant drive system. The FIGS. 2(a–c) may illustrate initialization of the volume 110 in accordance with the present invention.

In FIG. 2a, the volume 110 may illustrate an unwritten data and uninitialized redundancy configuration. An "Initialization Boundary" 116 may be at a LBA of zero of the volume 110. In FIG. 2b, the volume 110 may illustrate an area of (i) written data and initialized redundancy 112 and (ii) unwritten data and uninitialized redundancy 114. The volume 110 may track the highest sequential LBA written. The highest sequential LBA written may be implemented as the initialization boundary 116. A write to an LBA less than the initialization boundary 116 may be performed normally (e.g., performed using optimal RAID methods such as the RAID 5 read-modify-write method).

In FIG. 2c, the volume 110 may illustrate when a write to the same LBA that includes the initialization boundary 116 occurs. The volume 110 may create a valid redundancy location and update the initialization boundary 116 in response to a location conflict. Additionally, a write with an LBA greater than the initialization boundary 116 may be (i) returned with an error or (ii) performed in such a way as to create a valid redundancy without updating the initialization boundary 116. A write outside the initialize boundary 116 may occur at a next block of data. Initialization of redundancy may occur at the next block of data at that point and time. The initialization boundary 116 may also be used to alert redundancy parity scans of a known end of valid redundancy volume 110 in order to avoid reporting false errors.

Referring to FIG. 3, a method 200 is shown illustrating an operation of the circuit 100. The method 200 generally comprises a state 202, a state 204, a decision state 206, a state 208, a state 210, a decision state 212, a state 214, a finish state 216, a state 218 and an error state 220. The state 202 may receive a write command. The state 204 may determine a location of data to be written. The state 206 may determine where a location to be written to is located with respect to a boundary (e.g., the initialization boundary 116).

If the location is determined to be inside the boundary, the method 200 may move to the state 208. The state 208 may indicate no apparent conflicts. The state 208 may continue to the state 214. The state 214 may write data utilizing an appropriate redundancy method. The state 214 may then continue to the finish state 216.

If the location is determined to be at the boundary, the method 200 may move to the state 210. The state 210 may move the boundary and initialize a redundancy location to write the redundant data. The state 208 may then continue to the state 218, where the data is written to both the primary and redundancy data locations via a sequential initialization of the redundancy location. The state 218 may control writing data to a primary and redundancy volume simultaneously. The step 210 and the step 218 may occur simultaneously. Data is generally written only after no conflicts of data locations occur.

If the location is determined to be outside the boundary, the method 200 may move to the decision state 212. The decision state 212 may enforce a sequential write. If the sequential write is enforced, the method 200 may continue to the error state 220. If the sequential write is not enforced the method 200 may continue to the state 218, where the data is to be written and sequential initialization of redundancy data is to occur.

For example, an application that predominantly writes in a sequential fashion may initialize a redundant volume as primary data is written. The first time data is written to the primary area of the volume 110 (e.g., as data is written in a sequential fashion), data may be stored in adjacent blocks (e.g., from zero to the capacity of the volume). As data is written, the sequential data may be written to block 0, block 1, block 2, etc. Additionally, data may be written in groups of blocks. As data is written sequentially, the circuit 100 may be allowed to skip conventional redundancy initialization, by allowing the redundancy volume 110 to be initialized on an as needed basis. For example, the circuit 100 may only initialize the redundancy volume 110 as data is written outside of the primary data area (illustrated in FIG. 2c).

Additionally, a parity scan may occur to verify if there is parity consistency in the redundancy area of the volume 110. If the redundancy volume 110 is correct, then a request to write data past what is already initialized may be ignored. Such a request may be ignored, since a requested location has not yet been written to. A request up to an end block (e.g., the last valid data) that has been written may be checked for valid parity. The circuit 100 may be only required to check validity to the last valid data block.

A detailed analysis of one implementation of the present invention will now be described. Snapshot type copies may create an immediate copy of a volume without really copying all the data of the original volume. The snapshot copy may implement an instantaneous copy of the original volume. To access the snapshot copy another additional volume is required. The additional volume may be implemented as a snapshot volume. The snapshot volume is generally identical to the original volume at the point and time of origination of the snapshot copy. The snapshot copy/volume may allow the original volume to be modified normally. The snapshot volume may be then implemented to back up a tape or other similar function.

The snapshot volume may be implemented to save data that is to be modified. For example, if a write to the original volume occurs the system 100 (or 200) may first check to see if a copy of the data is saved in a predetermined location (e.g., a repository). If the data is not saved, the system 100 may read the original data from the original volume, save a copy of the original data and then allow the write to complete to the original volume. The snapshot volume may then only be required to store a sub-set of the original data. The snapshot volume may read the repository to check if new data has been saved. If the new data is saved, the circuit 100 may return to the snapshot volume because the prior data block of the snapshot copy still exists in the snapshot volume. If the data is not stored within the snapshot volume then the block of data has not been changed and the data of the original volume may be read.

The implementation of the repository is sequential in nature. The repository may be implemented as an additional volume. The repository may be implemented as an internal volume. The repository may need to be created from an existing volume. However, the repository may not be required to initialize redundancy on the volume since the repository may be written to sequentially. For example, the circuit 100 may write copies of data from the primary volume as they are being changed to the repository. The circuit 100 may also be configured to track where data is written. The circuit 100 generally provides essentially sequential implementation of a volume. Moreover, the sequential implementation may be internally implemented.

A host application may define a new volume and write to the volume sequentially. The host application may not be required to devote considerable amounts of time to initialization of redundancy volume. Additionally, volume that may be written to sequentially may also be checked for validity. The volume may be presented to the user as a specialized configuration. The specialized configuration may not be required to devote significant time to initializing redundancy volume initially.

The circuit 100 may implement immediate availability initialization. Since initialization is on a write, the circuit 100 may allow for optimization depending on how the data is received. If the data is received in large enough blocks, a parity is generated and the write is completed. If the data is received in small blocks another method may ensure a validity of the parity block that may not be initialized.

Furthermore, rather than initializing the redundancy data on a write, the present invention may initialize a repository comprising everything between the last block that was initialized and the last block written. Implementation of the repository may not guarantee absolutely sequential writes. However, the repository may ensure predetermined tolerances and may make adjustments for the tolerances allowing the system 100 to go back and initialize the parity for the few blocks between where the last known parity redundancy had been generated and the current block that is being written. The initial write is generally implemented at a same time as initialization of the redundancy volume. Every time a write is to be completed, an initialization for the written block of data is to occur. The present invention may allow writing of a block of data and initializing a redundancy volume at the same time.

The function performed by the flow diagram 200 may be implemented using a conventional general purpose digital computer programmed according to the teachings of the present specification, as will be apparent to those skilled in the relevant art(s) Appropriate software coding can readily be prepared by skilled programmers based on the teachings of the present disclosure, as will also be apparent to those skilled in the relevant art(s). The functions of the flow diagram 200 may be implemented along with conventional routines (e.g., be in the drive controller 102).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method for providing sequential initialization of redundancy data in a volume comprising the steps of:
   (A) defining a boundary;
   (B) determining a location of data with respect to said boundary; and
   (C) initializing a redundancy location of said volume as data and a redundancy of said data is written to said volume, wherein said initialization is performed only as data is written outside of a primary data area of said volume.

2. The method according to claim 1, wherein step (C) further comprises writing said data to a first portion of said volume and writing a redundancy of said data to a second portion of said volume.

3. The method according to claim 2, wherein said first portion comprises a primary data portion and said second portion comprises a redundancy data portion.

4. The method according to claim 1, wherein step (B) further comprises the step of:
   if said location is before said boundary, writing said data.

5. The method according to claim 4, wherein step (B) further comprises the step of:

if said location is after said boundary, (i) enforcing a sequential write or (ii) not enforcing a sequential write.

6. The method according to claim 5, wherein step (B) further comprises the step of:
   if said location is at said boundary, moving said boundary and initializing said redundant location.

7. The method according to claim 1, wherein boundary comprises an initialization boundary.

8. The method according to claim 1, wherein step (C) is further configured to sequentially write redundant data to a redundancy portion of said volume.

9. The method according to claim 1, wherein step (A) further comprises indicating an end of a primary data portion.

10. The method according to claim 1, further comprising the step of:
    (D) controlling steps (A), (B) and (C) in response to a predetermined attribute.

11. The method according to claim 10, wherein said predetermined attribute is user defined.

12. A controller software stored on a computer readable medium configured to perform the method of claim 1.

13. A computer readable medium configured to perform the method of claim 1.

14. An apparatus comprising:
    means for defining a boundary;
    means for determining a location of data with respect to said boundary; and
    means for initializing a redundancy location of said volume as data and a redundancy of said data is written to said volume, wherein said initialization is performed only as data is written outside of a primary data area of said volume.

15. An apparatus comprising:
    a volume configured to provide initialization of redundancy data, wherein circuit is configured to sequentially initialize a redundant location of said volume to store redundant data up to a boundary of said volume, wherein said initialization is performed (i) as said redundant data is written to said volume and (ii) only as data is written outside of a primary data area of said volume.

16. The apparatus according to claim 15, wherein said boundary is further configured to move and initialize a next redundant location.

17. The apparatus according to claim 15, wherein said volume is controlled by a host device.

18. The apparatus according to claim 15, wherein said apparatus further comprises a drive controller.

19. The apparatus according to claim 15, wherein said apparatus is configured to control one or more drives.

20. The circuit according to claim 19, wherein said apparatus is further configured to control one or more volumes of said one or more drives.

21. A method for providing sequential initialization of redundancy data in a volume, comprising the steps of:
    (A) receiving a write command;
    (B) determining a location of data to be written in said volume;
    (C) determining if said location is (i) inside, (ii) outside or (iii) at a boundary between an initialized portion and a non-initialized portion of said volume;
    (D) if said location is inside said boundary, writing data without initializing;
    (E) if said location is at said boundary, (i) moving said boundary and (ii) writing data while initializing said volume;

(F) if said location is outside said boundary, determining if a sequential write needs to be enforced;

(G) generating an error indication if a sequential write needs to be enforced; and (H) if a sequential write does not need to be enforced, initializing said volume as data is written.

22. A computer readable medium configured to perform the method of claim 21.

23. A method for providing sequential initialization of redundancy data in a volume comprising the steps of:

(A) defining a boundary;

(B) determining a location of data with respect to said boundary; and (C) initializing a redundancy location of said volume as data and a redundancy of said data is written to said volume wherein said sequential initialization is implemented in a snapshot volume.

* * * * *